United States Patent [19]

Karhunen et al.

[11] Patent Number: 5,317,315
[45] Date of Patent: May 31, 1994

[54] METHOD AND DEVICE FOR MEASUREMENT OF THE VELOCITY OF A MOVING TARGET BY MAKING USE OF THE DOPPLER SHIFT OF ELECTROMAGNETIC RADIATION

[75] Inventors: Pentti Karhunen, Vantaa; Henry Andersson, Espoo, both of Finland

[73] Assignee: Vaisala Oy, Finland

[21] Appl. No.: 18,789

[22] Filed: Feb. 17, 1993

[30] Foreign Application Priority Data

Feb. 24, 1992 [FI] Finland .................................. 920804

[51] Int. Cl.⁵ ...................... G01S 13/536; G01S 13/95
[52] U.S. Cl. ........................................ 342/26; 342/50; 342/104; 342/125
[58] Field of Search ...................... 342/26, 50, 104, 125

[56] References Cited

U.S. PATENT DOCUMENTS 3,701,151 10/1972 Sato et al. ..................... 342/125 X
5,055,849 10/1991 Andersson et al. ................. 342/104

*Primary Examiner*—T. H. Tubbesing
*Attorney, Agent, or Firm*—Jones & Askew

[57] ABSTRACT

Method and apparatus for measurement of the velocity of a moving target (20) in radio frequencies. From the measurement station (10) and from the target station (20), radio signals ($S_1, S_2$) are transmitted that are in different frequency ranges, as compared with each other, so that the receivers at the measurement station (10) and at the target station (20) are not subjected to interference. The radio signals ($S_1, S_2$) are received at stations (20,10) opposite to their transmission stations (10,20). The oscillator of the target station (20) is locked with the frequency transmitted by the measurement station (10) by means of a phase-locked loop (PLL). The frequency of said oscillator is passed to the transmitter part of the target station (20). The signal ($S_2$) transmitted by the target station (20) is received at the measurement station (10). The Doppler shift ($f_d$) of the frequency of the signal ($S_1$) transmitted from the measurement station (10) and of the signal received at the measurement station is measured, and the velocity (v) of the moving target to be measured is determined on the basis of the Doppler shift.

10 Claims, 4 Drawing Sheets

METHOD AND DEVICE FOR MEASUREMENT OF THE VELOCITY OF A MOVING TARGET BY MAKING USE OF THE DOPPLER SHIFT OF ELECTROMAGNETIC RADIATION

The invention concerns a method for measurement of the velocity of a moving target by making use of electromagnetic radiation, which is preferably in the range of radio frequency, and in which method a radio transmitter-receiver arrangement is employed both at the measurement station and at the target to be measured, by means of which arrangement radio signals are transmitted to, and received from, the opposite station, and in which method the Doppler shift included in the frequency of the signal transmitted from, and received at, the measurement station is detected at the measurement station, and on the basis of the Doppler shift the velocity of escape and/or approach of the target to be measured in relation to the measurement station is determined.

Further, the invention concerns an apparatus intended for carrying out the method of the invention, which apparatus comprises a transmitter-receiver arrangement and an antenna placed at the measurement station and a corresponding transmitter-receiver arrangement and an antenna placed at the moving target to be measured.

In the prior art, a number of methods are known by whose means, by means of electromagnetic radiation, the distance of the target and the speed of change of the distance are measured. In the prior art methods, as a rule, the time is detected that is taken by the transit of the radiation between the target and the measurement station.

The measurement of distance by means of the prior-art pulse radars is also based on the measurement of difference in time. Drawbacks of this prior-art method include the high radiation power required at the measurement station and the radar reflector required at the target. The drawbacks arise above all from the fact that the power received from the radar reflector at the measurement station is inversely proportional to the fourth power of the distance between the measurement station and the target. It is a further drawback that a pulse radar has a wide band and, thus, requires a large area of the radio-frequency spectrum.

Further, in the prior art, a narrow-band solution corresponding to the pulse radars is known, i.e. the Doppler CW-radar. The drawbacks are the same as those in the case of a pulse radar, for the operation follows the radar equation.

Also, in the prior art, a so-called secondary radar based on measurement of difference in time is known, wherein a transponder placed at the target is employed. In this system of measurement, at the moving target, there must be a receiver at the frequency of the transmitter placed at the measurement station as well as a transmitter operating at a different frequency, which frequency is far enough from the frequency of the transmitter placed at the measurement station so that the receiving of the weak signals arriving from the measurement station is not disturbed. At the secondary radar, the signal received by the transponder is detected, and it is used for modulation of the transponder transmitter, whose signal is received at the measurement station. By means of comparison of the signal transmitted from the measurement station and of the received signal from the moving target, it is possible to determine the transit time of the radio waves when the signal transmitted from the measurement station has been modulated in a suitable way. At the measurement station and at the target, relatively little transmission powers are sufficient, because the secondary radar does not follow the radar equation, but the attenuation of the signals over the communication distance is inversely proportional to the second power of the distance. A drawback of the transponder method is the necessity of two frequency channels placed relatively far apart from one another. Depending on the modulation method, the signals often also have relatively wide bands.

In the publications *Passive Tracking of Meteorological Radio Sondes for Upper Air Wind Measurements* by H. K. E. Tiefenau, A. Sprenger KG & Co., GFR, and prospectus of Philips "HWR 60/120 (P) Meteorologic Radar System with Passive Tracking Potential", a method is described by whose means a change in the distance between a moving target and a measurement station can be measured by comparing two very precisely known clock frequencies. One of these is generated at the target and the other one at the measurement station. By comparing the clock frequency transmitted from the target with the clock frequency generated at the measurement station, the Doppler shift in the clock frequency received from the target, arising from the approach or escape velocity of the target, is detected, and hereby the speed of change in the distance is determined.

The method described in the publications cited above has a narrow-band nature and requires the use of one frequency channel only, but its drawback is the extremely high stability requirement of the clock frequencies. For example, in radio sonde observations, the required stability is of an order of $10^{-9}/h$. The generation of such a stable clock frequency in a radio sonde results in great practical difficulties and in expensive equipment.

With respect to the prior art most closely related to the present invention, reference is made to the applicant's FI Patent 83,999 and to the corresponding U.S. Pat. No. 5,055,849. In said patents, a method for measurement of the velocity of a moving target is described that comprises a combination of the following steps:

from the measurement station and from the target station, radio signals are transmitted, whose signals differ from one another by a relatively little difference in frequency or by a Doppler frequency shift, the magnitude of the absolute value of the little difference in frequency remaining at least equal to the absolute value of the maximal predictable Doppler frequency shift; said radio signals are received at the stations opposite to their stations of transmission; at the measurement station and at the target station, a differential frequency or frequencies is/are formed between the received frequency, which includes a Doppler shift, and the locally generated reference frequency, which is substantially equal to the signal frequency and which is transmitted to the opposite station, so that the differential frequency or frequencies obtained is/are a low-frequency signal or, at the target station, possibly a zero-frequency signal; and, based on said differential frequencies, the Doppler frequency shift is determined, on whose basis the velocity of the target is obtained.

Compared with the method and the device of the present invention, it is an essential difference in the applicant's said patents that, in said patents, the target station and the measurement station transmit with the time-division system in the same frequency, and during its transmission sequence the target station "remembers" the frequency that it received. The object of the present invention is further development of the method and of the device known from said patents by means of a novel two-frequency method, the objective being above all to achieve a simpler construction of equipment, which is of particular importance especially in radio sonde applications.

The main object of the invention is to provide a novel method and device by whose means, based on the Doppler shift and in particular by making use of radiation in the radio frequency, it is possible to measure the relative velocity of movement of a measurement station in relation to a moving target so that the drawbacks that have come out above are substantially avoided.

It is a further object of the invention to provide said method and device of measurement without having to employ particularly precise clock frequency oscillators at the target to be measured.

A further object of the invention is to provide said method of measurement which provides economies in terms of radio frequencies.

It is a further object of the invention to provide a method and a device in which it is possible to employ transmitters of relatively low power and relatively simple circuits for economical embodiments.

It is a further object of the invention to provide a method and a device for precise tracking of the movement of a radio sonde moving along with the wind for determination of the wind vector by, in the measurement, combining the azimuth angle measurement by means of a radio direction finder and the information on the geometric elevation of the radio sonde, which can be derived from the pressure, temperature, and humidity measurements carried out by the sonde or, as a rule with lower precision, from estimated rising velocity of the sonde or, in stead of the information on the elevation, additionally the information on the elevation angle measured by means of direction finding.

In view of achieving the objectives stated above and those that will come out later, the method of the invention is mainly characterized in that the method comprises a combination of the following steps:

(a) from the measurement station and from the target station, radio signals are transmitted that are in different frequency ranges, as compared with each other, so that the receivers at the measurement station and at the target station are not subjected to interference, (b) said radio signals are received at stations opposite to their transmission stations, (c) the oscillator of the target station is locked with the frequency transmitted by the measurement station by means of a phase-locked loop, and the frequency of said oscillator is passed to the transmitter part of the target station, (d) the signal transmitted by the target station at the measurement station, (e) the Doppler shift of the frequency of the signal transmitted from the measurement station and of the signal received at the measurement station is measured, and the velocity of the moving target is determined on the basis of the Doppler shift.

On the other hand, the device in accordance with the invention is mainly characterized in that the high-frequency oscillator of the target station has been locked with a frequency that has a difference equal to the Doppler-shift frequency in comparison with the frequency of the stable high-frequency oscillator of the measurement station, and that the device comprises components by whose means the signal received at the measurement station is compared with the signal that was originally transmitted from the measurement station, the result that is obtained being a double Doppler shift, on whose basis the velocity to be measured can be determined.

Since the target station is constantly locked with the signal of the measurement station, the frequency of the target station remains stable, and the signals transmitted are narrow-band signals.

By means of the present invention, the following advantages of practical importance are carried into effect at the same time:

By means of the invention, it is possible to carry out measurement of radial velocity on the basis of the Doppler shift without particularly stable clock frequency oscillators placed at the moving target to be monitored, because the frequency of the transmitter at the moving target has been locked with the frequency of the transmitter at the measurement station.

The invention permits narrow-band operation in two frequency ranges. The method and the device provide economies in terms of radio frequencies, which are important advantages as compared, e.g., with the prior-art transponder systems.

By means of the invention, unlike the radar, it is possible to carry out measurement by means of low-power transmitters, because the signals are attenuated in proportion to the second power of the distance and not in accordance with the radar equation.

The circuit solutions necessary for the measurement are relatively simple.

In the following, the invention will be described in detail with reference to some exemplifying embodiments of the invention illustrated in the figures in the accompanying drawing, the invention being in no way strictly confined to the details of said embodiments.

Figure 1:
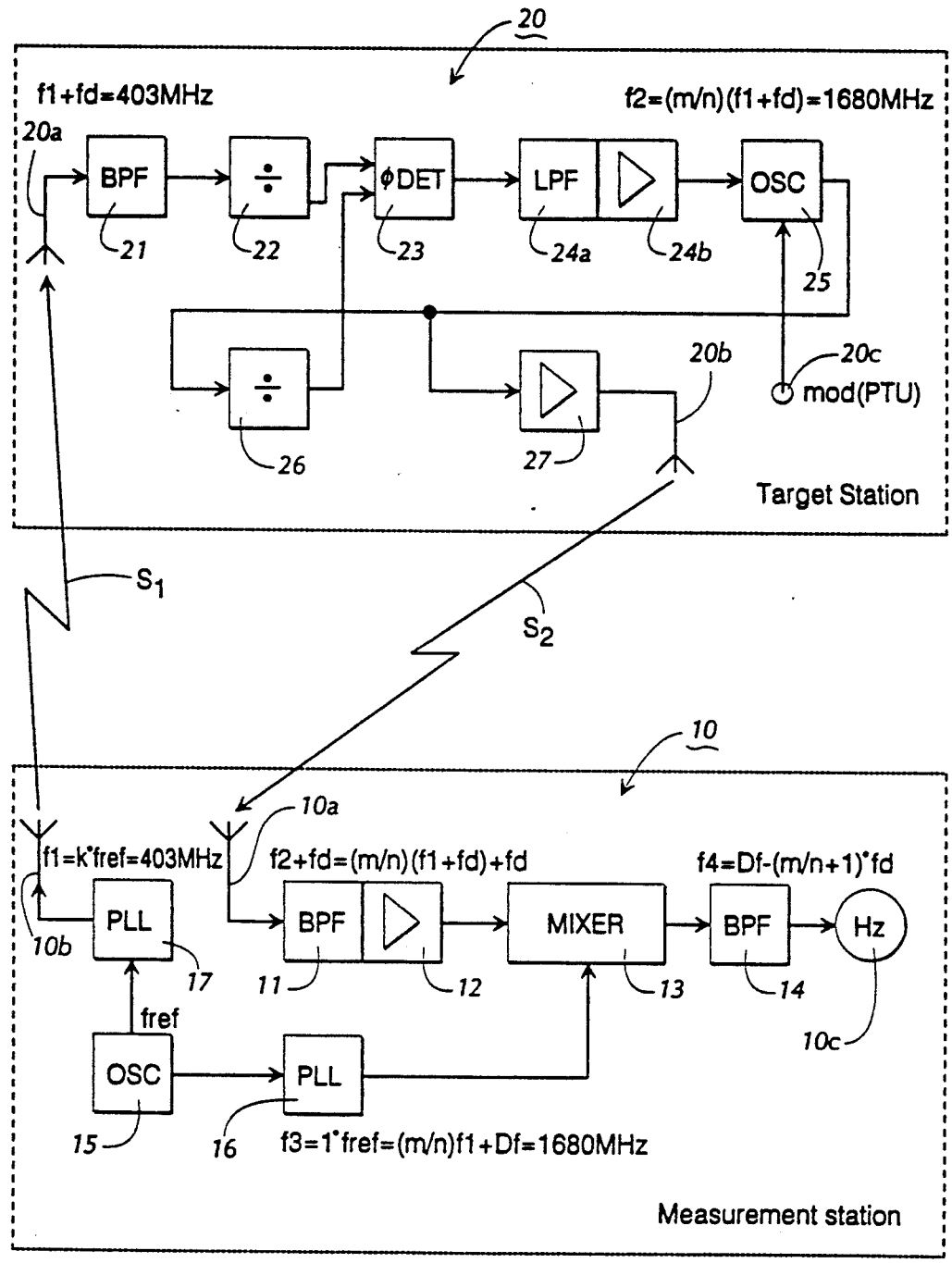
FIG. 1 illustrates the principle of the radio apparatus at the target station and at the measurement station as a block diagram.

In FIG. 1, the target station 20, which moves along with the wind, e.g., carried by a sonde balloon, receives, by means of its antenna 20a, the signal $S_1$ transmitted by the antenna 10b of the measurement station 10, which signal is typically in the range of 400 MHz and includes the Doppler shift arising from the movement of the target station 20. The target station 20 includes a high-frequency oscillator, which operates typically in the range of 1680 MHz and whose output frequency is amplified and transmitted to the measurement station 10 by the intermediate of the antenna 20b. The received signal $S_1$ of 400 MHz and the signal of 1680 MHz produced by the high-frequency oscillator are divided in a suitable way and passed into a phase detector, the frequency of the high-frequency oscillator being regulated by means of the control voltage provided by the phase detector. According to FIG. 1, the reference oscillator 15 of the measurement station 10 creates a reference frequency $f_{ref}$, from which all other frequencies of the system are derived. The reference oscillator 15 feeds the reference frequency to two phase-locked loops (PLL) 16 and 17 (the construction of the phase-locked loop will be described in more detail in relation to the description related to FIG. 4). On the basis of the reference frequency $f_{ref}$, the phase-locked loop 17 creates the transmission frequency $f1 = k*f_{ref}$, which is transmitted by means of the antenna 10b.

The frequency f1 is received at the target station 20, because of whose moving away or approaching the frequency that is received is changed from f1 to f1+fd, wherein fd is the Doppler shift. The band-pass filter 21 has been tuned for the frequency to be received ~403 MHz. The frequency that is received is lowered to the frequency (f1+fd)/n in the frequency divider 22. The phase detector 23 controls the voltage-controlled high-frequency oscillator 25 through the low-pass filter 24a and the amplifier 24b so that the frequency of the oscillator 25 cannot creep, but it remains precisely at the frequency (f1+fd)* (m/n). The output of the oscillator 25 is, viz., fed into the second input of the phase detector 23 after it has been divided 26 by the number m. If the frequency of the oscillator tends to rise, the phase detector 23 controls the oscillator 25 to lower the frequency, and the other way round. Thus, the oscillator 25 of the target station 20 operates as phase-locked with the reference oscillator 15 of the measurement station 10. The frequency (m/n) * (f1+fd) of the oscillator 25 is transmitted through the antenna 20b to the measurement station 10 after it has been modulated with the useful signal (PTU) and after amplification 27.

When the target station 20 is a radio sonde that rises on support of a sonde balloon and moves along with the wind, the unit 20c contains measurement detectors by whose means the atmospheric pressure (P), the temperature (T), and the relative humidity (U) are measured. A carrier wave is modulated with said measurement signals (PTU), and thereby the measurement signals (PTU) are transmitted telemetrically by the intermediate of the radio signal $S_2$ to the measurement station 10, where they are detected by means of the devices 10c in a way in itself known.

A second Doppler shift is produced in the frequency of the signal $S_2$ received at the measurement station 10 by means of the antenna 10a, whereby the frequency of said signal is f2+fd=(m/n) * (f1+fd)+fd.

The receiving is carried out by means of a band-pass filter 11, after which, having been amplified in the unit 12, the signal is fed into the mixer 13. Into the second input of the mixer 13, the frequency $f3 = 1 * f_{ref} = (m/n)f1 + Df$ is fed, which has been created from the reference frequency $f_{ref}$ of the system in the phase-locked loop (PLL) 16. By means of the band-pass filter 14, the following differential frequency is passed through:

$$f4 = f3 - (f2+fd) = (m/n)f1 + Df - (m/n)(f1+fd) - fd$$
$$= -(m/n+1)*fd + Df$$

From this, it is easy to notice the frequency fd of the Doppler shift. Df is the frequency by whose means it is, for example, possible to optimize the pass-through of the band-pass filter 14. The frequency Df prevents changing of the sign of the frequency f4.

FIG. 1 is a schematic illustration of the unit 10c, in which the Doppler shift is detected and on its basis, the velocity of the target station 20 in relation to the measurement station 10 is calculated from the following formula:

$$v_r = \lambda * fd$$

wherein $v_r$ is the radial velocity and $\lambda$ is the wave length of the frequency $f_1$.

By means of the unit 10c, it is also possible to detect and to display the measurement signals (PTU).

Figure 2:
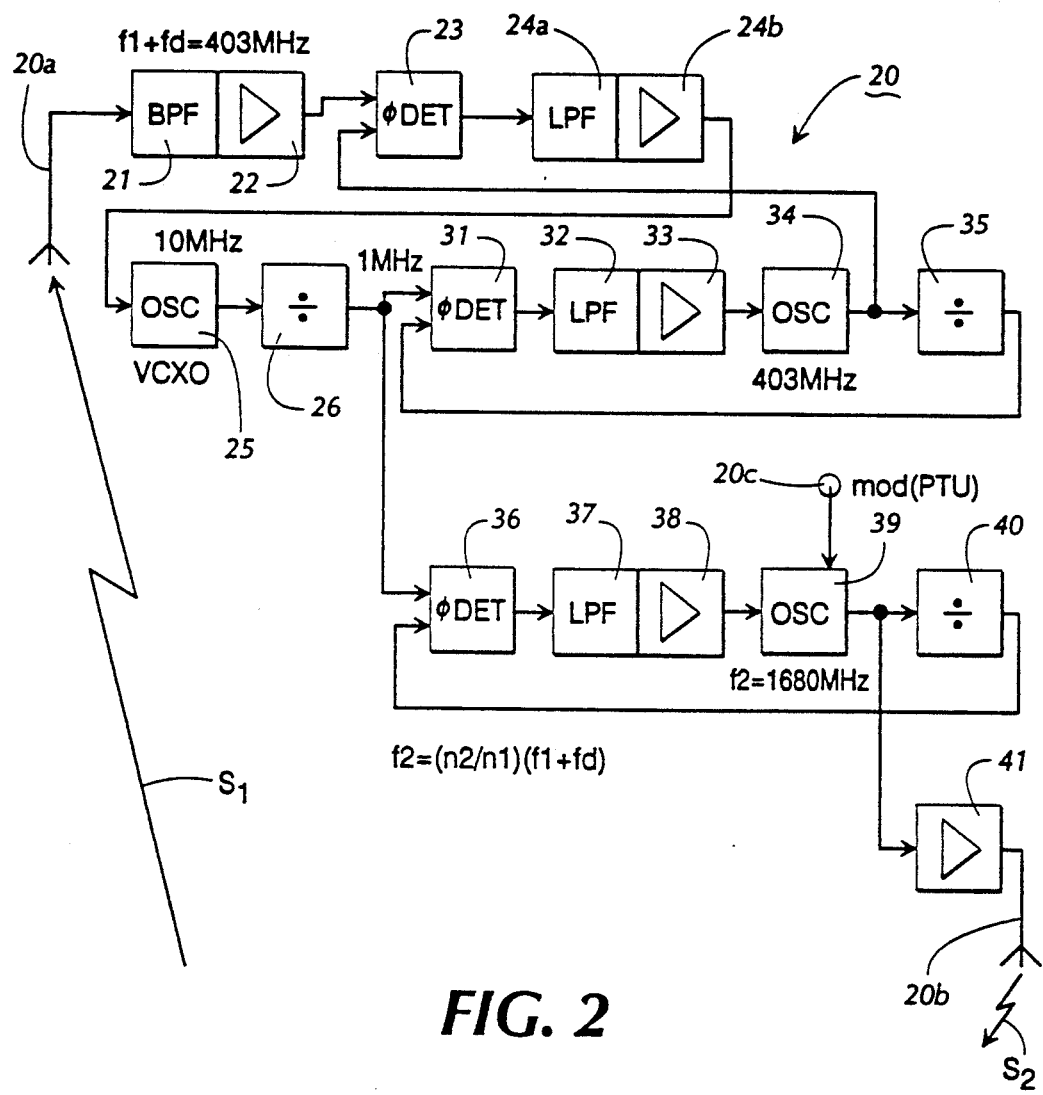
FIG. 2 illustrates an embodiment of the radio apparatus at the target station when a homodyne receiver is employed.

The receiver part of the target station 20 can be accomplished either by means of the homodyne principle or by means of the heterodyne principle. FIG. 2 illustrates an embodiment employing the homodyne principle.

According to FIG. 2, the band-pass filter 21 and the amplifier 22 are penetrable by the amplified signal f1, which has been summed with the Doppler component fd. Thus, the frequency is again f1+fd, which is usually about 403 MHz. The phase detector 23 controls the phase-locked loop 31 ... 35 through the low-pass filter 24a, the amplifier 24b, the oscillator 25, and through the frequency divider 26. The frequency of the phase-locked loop 31 ... 35 is locked by means of the phase detector 31 so that it is precisely equal to the frequency f1+fd. Thus, the phase detector 31 keeps the loop 31 ... 35 at the correct frequency, which is regulated by means of the oscillator 25 and by means of the frequency divider 26, which are again regulated by the phase detector 23. In this way, a voltage-controlled, phase-locked oscillator 31 ... 35 has been accomplished, which is locked exactly with the frequency of the received signal 31. Thus, the loop 31 ... 35 is a sort of an auxiliary oscillator, which keeps the frequency of the system stable. The received signal f1+fd is not used directly for controlling the loop 36 ... 40, which loop operates identically with the loop 31 ... 35, even though at a different frequency. The oscillator 39 of the loop 36 ... 40 is also controlled by means of the useful signal (PTU) so as to modulate the signal f2. The amplifier 41 amplifies the signal f2=(n2/n1)(f1+fd) before the signal is transmitted by the intermediate of the antenna 20b.

Figure 3:
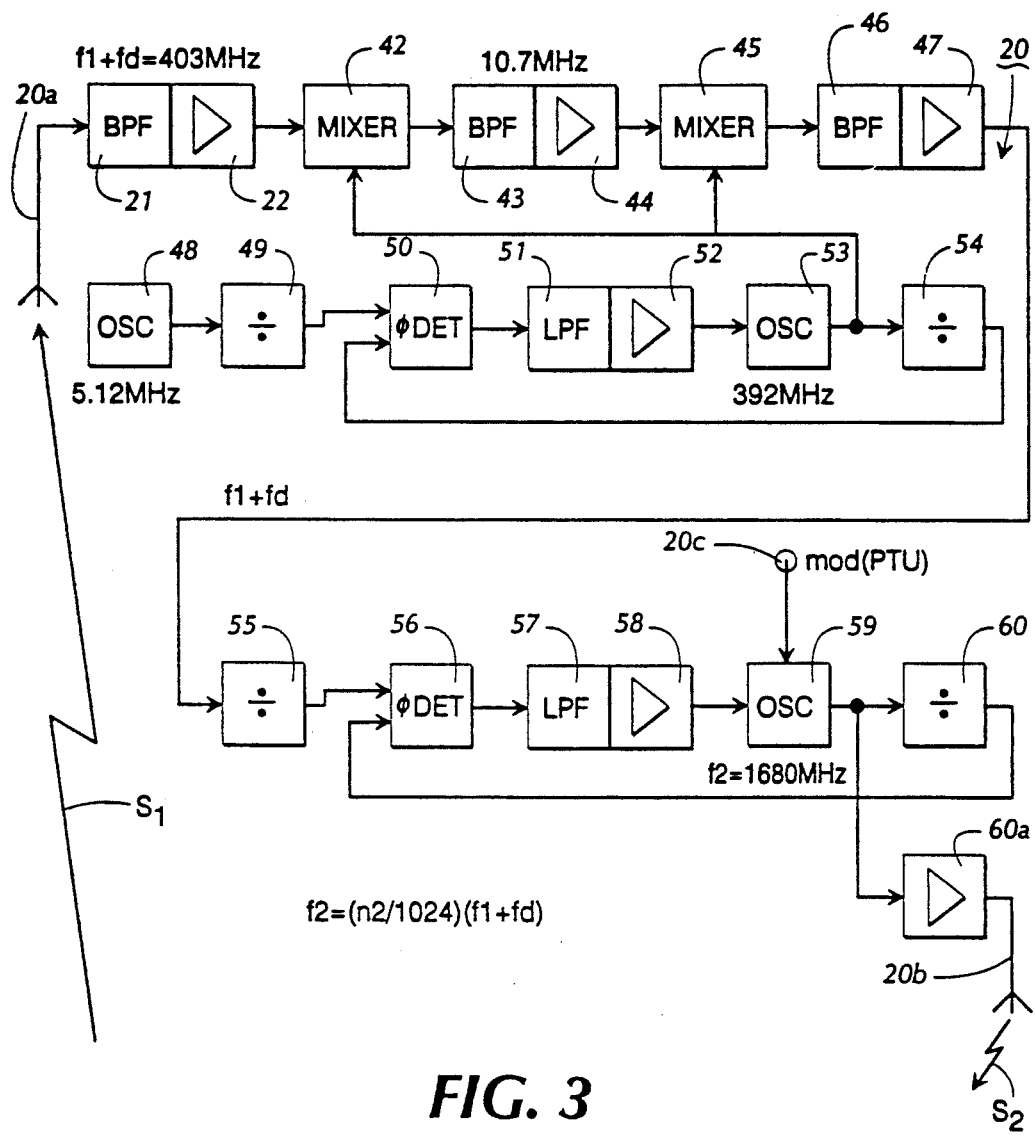
FIG. 3 illustrates an embodiment of the radio apparatus at the target station when a heterodyne receiver is employed.

FIG. 3 illustrates an embodiment of the receiver at the target station 20 by means of the heterodyne principle.

According to FIG. 3, the oscillator 48 creates a frequency of 392 MHz in the phase-locked loop 50 ... 54. This frequency is employed in the mixers 42 and 45 for a transfer to an intermediate frequency and for rising from same. The phase detector 50 monitors the oscillation frequency of the oscillator 53 in the phase-locked loop 50 ... 54 and, if necessary, corrects it so that it is precisely equal to the frequency 5.12 MHz/256. The signal f1+fd is received by means of the selection of the band-pass filter 21. It is passed to the mixer 42 at an intermediate frequency for transfer. The amplification and the filtering take place at an intermediate frequency 10.7 MHz=403 MHz−392 MHz between the mixers 42 and 45 by means of the filter 43 and the amplifier 44. The signal is again amplified and filtered 46 and 47, being passed to the phase-locked loop 56 ... 60 of the transmitter part, which loop operates identically with the phase-locked loop 50 ... 54, even though at a different frequency. The signal frequency f2 is modulated with the useful signal (PTU) in the oscillator 59. The amplifier 60a amplifies the signal f2 (n2/1024)(f1+fd)

before it is transmitted by the intermediate of the antenna 20b.

Figure 4:
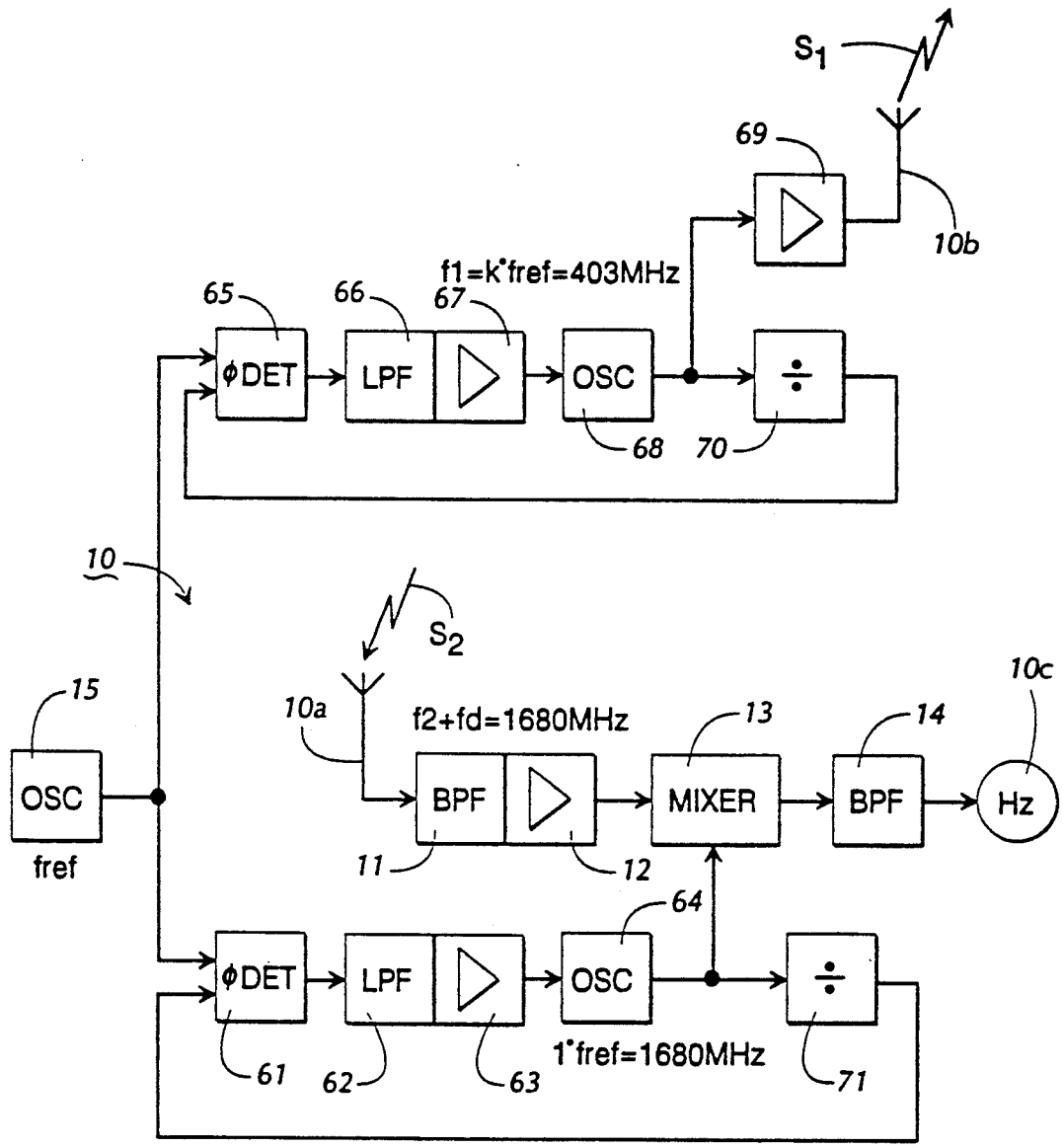
FIG. 4 illustrates a more precise embodiment of the measurement station.

FIG. 4 shows an embodiment of the measurement station 10 that employs two high-frequency oscillators and a reference oscillator. The block diagram also illustrates the modulation of the PTU (pressure, temperature, humidity) signal into the carrier wave of the transmitter of the target station 20. Since, in the method described, the measurement of wind is based on the Doppler shift, a conventional constant FM-modulation cannot be employed, except in a time-division system, in which case the Doppler measurement can be carried out from an unmodulated signal transmitted in between. A second possibility is to use PSK-modulation for the modulation of the PTU-signals, in which case the phase shifts of 180° in the carrier wave can be eliminated in the Doppler measurement based on phase measurement.

According to FIG. 4, the precise reference oscillator 15 provides the reference frequency $f_{ref}$ needed for the formation of the other frequencies. The phase-locked loop 65 ... 70 precisely maintains the transmission frequency $f1 = k*f_{ref}$ as follows. At the beginning of the loop, there is a double-input phase detector 65, which controls the oscillator 68 through the low-pass filter 66 and the amplifier 67. The oscillator 68 feeds the transmitter amplifier 69 and the frequency divider 70, which divides the frequency of the signal by the number k and feeds it into the second input of the phase detector. Thus, the phase detector 65 is capable of detecting a creep of the oscillator and of correcting it in the necessary direction. The phase-locked loop 61 ... 64 and 71 operates in a fully corresponding way, even though at a different frequency. It feeds the mixer 13, into one of whose inputs the received and amplified 12 signal f2+fd, which has been selected by means of the band-pass filter 11, is passed. The desired differential frequency is obtained by means of the band-pass filter 14, and the Doppler shift can be determined from this frequency.

The most advantageous application of the method and the device in accordance with the invention is radio sondes and in connection with them, measurement of wind, which may also be favorably integrated with telemetric measurement of the parameters (PTU) of the atmosphere, which can be detected by means of detectors of a radio sonde, which are in themselves known, in the way sketched above. In said telemetric measurements (PTU), it is possible to employ other methods and devices in themselves known, which need not be described in detail in this connection.

In the following, the patent claims will be given, and the various details of the invention may show variation within the scope of the inventions defined in said claims and differ from those described above for the sake of example only.

We claim:

1. Method for measurement of the velocity of a moving target (20) by making use of electromagnetic radiation, which is preferably in the range of radio frequency, and in which method a radio transmitter-receiver arrangement is employed both at the measurement station (10) and at the target (20) to be measured, by means of which arrangement radio signals are transmitted to and received from the opposite station (10), and in which method the Doppler shift (fd) included in the frequency of the signal ($S_1$, $S_2$) transmitted from and received at the measurement station (10) is detected at the measurement station (10), and on the basis of the Doppler shift (fd) the velocity (v) of escape and/or approach of the target (20) to be measured in relation to the measurement station (10) is determined, characterized in that the medium comprises a combination of the following steps:
   (a) from the measurement station (10) and from the target station (20), radio signals ($S_1$, $S_2$) are transmitted that are in different frequency ranges, as compared with each other, so that the receivers at the measurement station (10) and at the target station (20) are not subjected to interference,
   (b) receiving said radio signals ($S_1$, $S_2$) at stations (20, 10) opposite to their transmission stations (10, 20),
   (c) locking the oscillator of the target station (20) with the frequency transmitted by the measurement station (10) plus or minus the Doppler shift by means of a phase-locked loop (PLL), and passing the frequency of said oscillator to the transmitter part of the target station (20),
   (d) receiving the signal ($S_2$) transmitted by the target station (20) at the measurement station (10), and
   (e) measuring the Doppler shift (fd) of the frequency of the signal ($S_1$) transmitted from the measurement station (10) and of the signal received at the measurement station, and determining the velocity (v) of the moving target on the basis of the Doppler shift.

2. Method as claimed in claim 1, characterized in that the frequency given by a high-frequency oscillator (25) of the target station (20) is amplified (27) and transmitted to the measurement station (10) and that the received signal ($S_1$) and the signal given by the high-frequency oscillator (25) are divided (22, 26) in a suitable way and passed to a phase detector (23), the frequency (f2) of the high-frequency oscillator (25) being regulated by means of the control voltage provided by said phase detector (23), that, at the measurement station (10), two high-frequency oscillators (16, 17) are controlled by means of the signal provided by the reference oscillator (15), the signal ($S_1$) of one of said oscillators (17) being transmitted to the target station (20), and the signal ($S_2$) transmitted by the target station (20) is compared with the signal of said other high-frequency oscillator (16) so as to detect the Doppler shift (fd).

3. Method as in claim 1, characterized in that the receiver part of the target station (20) is accomplished by means of the homodyne principle wherein the frequency of the high-frequency oscillator is controlled to be precisely equal to the received signal that includes the Doppler shift, and these are compared in a phase detector, by means of whose output signal the oscillator is controlled, said high-frequency oscillator and the oscillator of the transmitter part being locked with the output of said oscillator.

4. Method as in claim 1, characterized in that the receiver part of the target station (20) is accomplished by means of the heterodyne principle wherein the high-frequency oscillator is controlled so that, when the received signal that includes the Doppler shift (fd) is mixed with the frequency of the high-frequency oscillator, an intermediate frequency is obtained, which is filtered and amplified as well as mixed again upwards by making use of the signal of the high-frequency oscillator, whereby the mixing procedures are neutralized and the result that is obtained is a filtered signal that includes the Doppler shift (fd), by means of which signal the high-frequency oscillator of the transmitter is controlled.

5. Method as in claim 1, characterized in that the measurement station (10) is accomplished by employing two high-frequency oscillators and a reference oscillator.

6. Method as in claim 1, characterized in that the target station (20) is used is a radio sonde, by whose means measurement signals corresponding to at least one of the atmospheric pressure (P), temperature (T), and the relative humidity (U) is measured, the carrier wave of the transmitter of the target station (20) is modulated by means of said measurement signals, preferably by means of PSK-modulation, in which case the phase shifts of 180° in the carrier wave can be eliminated in a Doppler measurement based on phase measurement, or the Doppler measurement and said measurement (PTU) is carried out by means of a time-division system.

7. Apparatus intended for measurement of the velocity of a moving target (20) by making use of electromagnetic radiation, which is preferably in the range of radio frequency, and in which a radio transmitter-receiver arrangement is employed both at the measurement station (10) and at the target (20) to be measured, by means of which arrangement radio signals are transmitted to and received from the opposite station (10), and wherein the Doppler shift (fd) included in the frequency of the signal ($S_1$, $S_2$) transmitted from and received at the measurement station (10) is detected at the measurement station (10), and on the basis of the Doppler shift (fd) the velocity (v) of escape and/or approach of the target (20) to be measured in relation to the measurement station (10) is determined, the apparatus comprising a transmitter-receiver arrangement and an antenna placed at the measurement station (10) and a corresponding transmitter-receiver arrangement and an antenna placed at the moving target (20) to be measured, characterized in that:

the high-frequency oscillator of the target station (20) is locked with a frequency that has a different equal to the Doppler-shift frequency (fd) in comparison with the frequency of the stable high-frequency oscillator of the measurement station (10), and that the apparatus comprises means operative for comparing the signal ($S_2$) received at the measurement station (10) with the signal ($S_1$) that was originally transmitted from the measurement station (10), a double Doppler shift (fd) being obtained, on whose basis the velocity (v) of the target station (20) to be measured can be determined.

8. Apparatus as claim 7, characterized in that the target station (20) has receiver means operating by the homodyne principle.

9. Apparatus as in claim 7, characterized in that the target station (20) has receiver means operating by the heterodyne principle.

10. Apparatus as in claim 7, wherein the target station (20) is a radio sonde, which has detectors producing measurement signals responsive to the measurement of at least one of atmospheric pressure, temperature, and relative humidity (PTU), characterized in that the carrier wave of the transmitter of the radio sonde is modulated with said measurement signals (PTU), preferably by means of PSK-modulation or by means of a time-division system, together with the Doppler shift (fd) employed for wind measurement, so that the Doppler measurement can be carried out from an unmodulated signal transmitted in between.

* * * * *